(No Model.)

P. L. SYLVESTER.
Manufacture of Buttons from Plastic Material.

No. 232,567. Patented Sept. 21, 1880.

WITNESSES:
Jas. E. Hutchinson.
Henry C. Hazard.

INVENTOR:
P. L. Sylvester, by
Geo. S. Prindle, his Atty

UNITED STATES PATENT OFFICE.

PHILIP L. SYLVESTER, OF AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 232,567, dated September 21, 1880.

Application filed July 21, 1880. (No model.)

*To all whom it may concern:*

Be it known that I, PHILIP L. SYLVESTER, of Auburn, in the county of Cayuga, and in the State of New York, have invented certain new and useful Improvements in Manufacture of Buttons from Plastic Material; and I do hereby declare that the following is a full, clear, and exact description thereof, reference being had to the accompanying drawings, making a part of this specification, in which—

Figure 1:
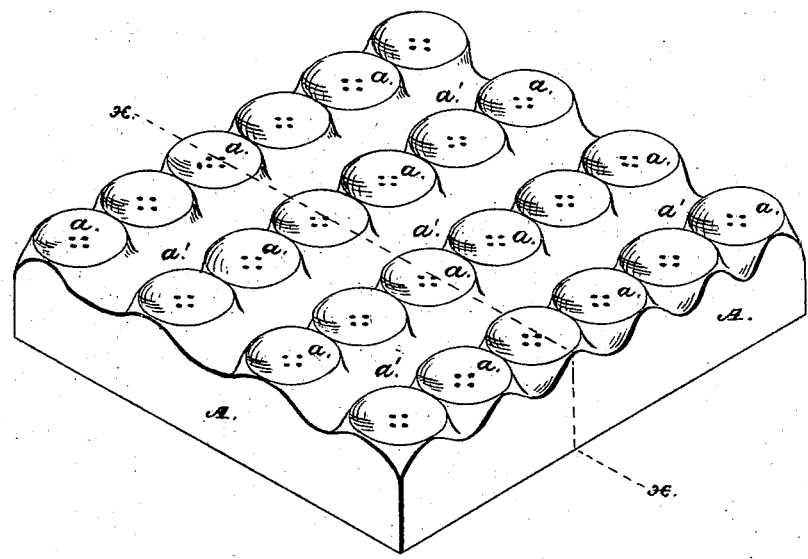
Figure 2:
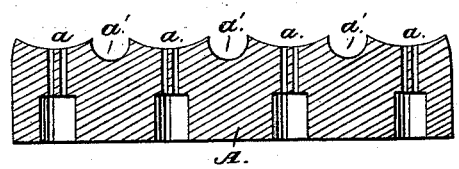

Figure 1 is a perspective view of my improved die-plate, and Fig. 2 is a section of the same upon line *x x* of Fig. 1.

Letters of like name and kind refer to like parts in each of the figures.

In the manufacture of buttons from plastic material it is desirable that a number of dies should be formed upon or within one plate, so that at one operation many buttons may be produced; but great difficulty has heretofore been experienced in disposing of the surplus stock between said dies so as to permit the plates to close together, and many expedients have been resorted to, such as the separate filling of each die by means of balls of material, the filling of each row of dies by means of strips of material, &c.

The design of my invention is to enable a sheet of plastic material to be employed for filling the dies of a plate without other preparation than rolling to thickness and cutting to size; and to this end it consists, as an improvement in the manufacture of buttons from plastic material, in a die-plate provided upon or within its face with dies which are arranged in rows and such rows separated from each other by means of grooves, substantially as and for the purpose hereinafter specified.

In the annexed drawings, A represents a metal plate having any desired horizontal dimensions, and provided upon or within its upper face with a number of button-dies or recesses, *a*. The dies *a* are arranged in rows, with the edges of the dies of each row nearly or quite in contact, while between said rows are formed grooves *a'*, that have preferably a width nearly equal to the width of a row of dies and a depth equal to about one-half of their width.

The die-plate A is used in connection with a corresponding upper plate, the material from which the button is to be made being placed between said plates in a plastic state and pressure applied in the usual manner. Said plastic material is used in the form of a sheet having the necessary size to cause it to cover said plate A, and all surplus stock being pressed into and contained by the grooves *a'* permits said die-plates to close together, so as to form a perfect button.

Having thus fully set forth the nature and merits of my invention, what I claim as new is—

As an improvement in the manufacture of buttons from plastic material, a die-plate provided upon or within its face with dies which are arranged in rows and such rows separated from each other by means of grooves, substantially as and for the purpose specified.

In testimony that I claim the foregoing I have hereunto set my hand this 12th day of July, 1880.

PHILIP L. SYLVESTER.

Witnesses:
GEO. S. PRINDLE,
E. D. WOODRUFF.